United States Patent [19]

Verdier

[11] 4,079,768
[45] Mar. 21, 1978

[54] PNEUMATIC TIRE WITH EMERGING TREAD REINFORCEMENT

[75] Inventor: Henri Verdier, Beauregard-L'Eveque, France

[73] Assignee: Compagnie Generale des Etablissements Michelin, Clermont-Ferrand, France

[21] Appl. No.: 600,124

[22] Filed: Jul. 29, 1975

[30] Foreign Application Priority Data

Jul. 31, 1974 France .................. 74 26701

[51] Int. Cl.$^2$ .................. B60C 13/00; B60C 9/18
[52] U.S. Cl. .................. 152/353 R; 152/209 R; 152/354 R; 152/361 R; 152/360
[58] Field of Search .............. 152/360, 361 R, 209 R, 152/352, 353 R, 209 WT, 354

[56] References Cited

U.S. PATENT DOCUMENTS

| | | | |
|---|---|---|---|
| 1,189,223 | 7/1916 | Albrecht | 152/209 WT |
| 1,337,660 | 4/1920 | Killen | 152/209 WT |
| 2,477,754 | 8/1949 | Kraft | 152/209 WT |
| 2,541,506 | 3/1951 | Cuthbertson et al. | 152/360 |
| 3,044,519 | 7/1962 | Wright | 152/209 R |
| 3,450,182 | 6/1969 | Verdier | 152/352 |
| 3,481,385 | 12/1969 | Depmeyer et al. | 152/360 |
| 3,516,465 | 6/1970 | Guyot | 152/360 |
| 3,814,161 | 6/1974 | Powell et al. | 152/352 |
| 3,870,095 | 3/1975 | Tangorra | 152/361 R |
| 3,976,115 | 8/1976 | Mirtain et al. | 152/361 R |

FOREIGN PATENT DOCUMENTS

785,097  10/1957  United Kingdom ............ 152/209 R

Primary Examiner—Drayton E. Hoffman
Attorney, Agent, or Firm—Brumbaugh, Graves, Donohue & Raymond

[57] ABSTRACT

A pneumatic tire has a tread reinforcement formed of at least two plies of cords which are parallel in each ply and crisscross from one ply to the other, and a tread of which the surface intended to make contact with the ground is narrower than the tread reinforcement. The plies of the tread reinforcement have cords arranged at angles of an absolute value at most equal to 45° with respect to the longitudinal direction of the tire, at least in the zones farthest from the equatorial plane of the tire. On at least one side of the equatorial plane, the tread reinforcement emerges laterally from the portion of the tread not in contact with the ground, by an axial length at most equal to 50 percent of the axial half-width of the tread, measured at the place where the tread reinforcement emerges from the tread. Rubber surrounds the emerging portion of the tread reinforcement on all sides, the surface of the rubber covering the radially outer face of the emerging portion, as seen in radial section, being located at a distance from the axis of rotation of the tire less than the distance from the axis of rotation to the surface of the tread intended to make contact with the ground.

13 Claims, 8 Drawing Figures

PNEUMATIC TIRE WITH EMERGING TREAD REINFORCEMENT

BACKGROUND OF THE INVENTION

This invention relates to pneumatic tires and, more particularly, to a novel and highly-effective pneumatic tire having an extraordinary reinforcement in the region of the tread, comprising, for instance, at least two plies of crossed cords.

Ordinarily, the tread reinforcement, whatever the type of carcass, whether bias or radial, has the purpose (a) of stiffening the tread, that is to say the portion of the tire which comes into contact with the ground, in order to prevent deformations which might affect the tread tangentially to its area of contact with the ground, and therefore (b) of attenuating or avoiding certain stresses which are unfavorable to the behavior and life of the tire. For this reason, the tread reinforcement has, in general, an axial width which is close to that of the travel surface, that is to say of the surface of the tread which is intended to make contact with the ground, whatever the width of the tread with respect to the maximum axial spacing between the two sidewalls of the tire.

Protruding treads are known for instance from U.S. Pat. No. 3,450,182. In that case the protrusion of the tread protects the sidewalls of the tire against damage by sharp solid bodies, while assuring additional adherence and a reduction in the pressure of the tire on the ground.

In other conventional tires, as disclosed, for example, in French patent No. 1,290,431, the tread reinforcement width is slightly greater than the width of the travel surface. This construction, by means of a ply of cords forming an angle of 90° with the longitudinal direction, attenuates the axial contraction of a removable tread. In another example (French patent No. 1,558,415), the width of the tread reinforcement is at least equal to that of the completely worn travel surface so as to slow down the wear of the edges of the tread.

The major drawback of the conventional arrangements is that they contribute no attenuation of the shear stresses in the marginal zones of the plies of the tread reinforcement where these stresses are responsible for separation or cleavage between the plies. On the contrary, some of these arrangements are of such a nature that they increase the shear stresses between the crown plies in the marginal zones.

SUMMARY OF THE INVENTION

An object of the invention is to remedy the problems of conventional tires discussed above. In particular, an object of the invention is to improve the resistance to cleavage in the marginal zones of the tread reinforcement by providing a tread reinforcement at the edges of which the effects of the contraction due to the inflation pressure and to the flattening of the tire on the ground are reduced or even eliminated.

These and other objects are attained in accordance with the invention by a tire having (a) a tread reinforcement formed of at least two plies of cords which are parallel within each ply and crisscross from one ply to the other and (b) a tread having a travel surface of ordinary width but not as wide as the tread reinforcement. The tire is characterized in that:

the plies of the tread reinforcement have cords arranged at angles, the absolute value of which is at most equal to 45°, measured with reference to the longitudinal direction, at least in the zones farthest away from the median or equatorial plane of the tire;

on at least one side of the tire, the tread reinforcement emerges laterally from the portion of the tread not in contact with the ground by a length at most equal to 50 percent of the axial half-width of the tread at the place where the reinforcement emerges from the tread; and rubber surrounds the emerging portion of the tread reinforcement on all sides, the surface of rubber surrounding the radially outer face of the emerging portion being, as seen in radial section, located at a lesser distance from the axis of rotation than is the tread.

Before describing in detail the preferred embodiments of the invention, it should be pointed out that the length of the emerging portion of the tread reinforcement in accordance with the invention is measured axially from the normal lateral contour of a tread of conventional section, in view of the volumes of rubber which, in accordance with the invention, surround the emerging portion on its radially outer and inner and axially outer faces. Likewise, the corresponding half-width of the tread is measured axially.

As a result of the invention, the entire zone of the tread in contact with the ground benefits from the stiffening action of the tread reinforcement, as described above. On the other hand, the emerging portion of the tread reinforcement is removed from the movements of compression and contraction coming from the adjacent portions (tread and sidewalls) of the tire. Therefore, this emerging portion escapes the shear stresses and heating developed between the edges of tread plies of customary width, which are harmful to the life of the connecting rubber. Furthermore, the emerging portion constitutes a heat sink which is capable of decreasing the operating temperature of the other zones of the tread reinforcement, particularly when the latter have reinforcing elements which conduct heat well.

The tread reinforcement in accordance with the invention preferably emerges by 4% to 10% of the axial half-width of the tread at the point of emergence. To extend the emerging width beyond 20 percent of the half-width results in no further substantial decrease in the marginal stresses between the tread plies. Nevertheless in certain cases it may be useful for the emerging width to reach 50 percent of the half-width. The width of the portion of the tread reinforcement contained between the equatorial plane of the tire and the end of the portion emerging in accordance with the invention should preferably be between 45% and 60% of the greatest axial width of the tire measured on the outside location at the sidewalls. For a reinforcement whose two edges emerge, in accordance with the invention, from the tread, the total width of this reinforcement will thus preferably be between 90% and 120% of the greatest axial width of the tire at the sidewalls.

The invention applies, of course, to all tread reinforcements intended to cooperate with all types of carcass reinforcements, namely bias ply, radial ply, or partially radial and partially bias. It applies also to tires without a carcass reinforcement but having a tread reinforcement. Finally, it applies to tread reinforcements comprising plies having substantially the customary width, or a fraction of such width, with or without folded-over portions, whatever the meridian curvature of these reinforcements. It is particularly well-suited for so-called cylindrical tread reinforcements, that is to say reinforcements whose meridian curvature is smaller than the longitudinal curvature; such reinforcements are usual in tires for earthmovers. As a matter of fact, these tread reinforcements, when they are of customary width, always remain subject to marginal stresses, which tend to shorten their life despite the relatively large distance of their edges from the neutral fiber of the carcass of the tire.

In the case of tires intended to travel on ground strewn with hard obstacles such as stones, rocks, etc., it is preferable to provide the terminal zones of the tread reinforcements with rubber strips of reduced width and of suitable modulus of elasticity at 100 percent elongation, which are interposed between the ends of the plies constituting these tread reinforcements. The width of the rubber strips preferably does not exceed the width of the emerging portion.

It is also advantageous to impart a meridian profile with an axially outwardly facing concavity to the mass of rubber covering the radially inner face of the emerging portion of the tread reinforcement. This embodiment of the invention makes it possible, with all desired effectiveness, to isolate the emerging marginal zones of the tread reinforcements from the reactions of the sidewalls of the tires, and even to reduce the width of the emerging zones. However the concavity between the radially inner face of the emerging zone of the tread reinforcement and the sidewall can also be filled with a rubber of a modulus which is preferably between 80 and 200 g/mm² at 100 percent elongation.

The tread of the tire in accordance with the invention is of course provided with elements in recess and in relief which are suitable for the use for which the tire is intended. The rubber which covers, on the radially outer side, the emerging portion of the tread reinforcement in accordance with the invention may be smooth or provided with recessed or relief elements in order, for instance, to control the rigidity of the emerging portion or to promote the removal of the heat drawn away by the end of the emerging portion.

With respect to the portion of the rubber covering the emerging portion in accordance with the invention axially outward of the emerging portion, it preferably has a thickness (measured in the axial direction) which is between 1% and 10% of the axial half-width of the tread at the place where the tread reinforcement emerges from the tread.

Although it is more economical to use, for the rubber which in accordance with the invention covers the emerging portion of the tread reinforcement, the same rubber as that used for the tread or for the covering or protection, respectively, of the corresponding sidewall, this does not exclude the use of a different rubber to cover the emerging portion of the tread reinforcement, for instance the rubber used to calender the tread plies or that possibly interposed between the ends of the tread plies, as contemplated in the present specification.

The combining of the tread reinforcement in accordance with the invention with a tread having at least one shoulder protruding from the greatest axial width of the tire in accordance with French patent No. 1,452,787 also gives outstanding results.

Although it is advantageous to apply the arrangement in accordance with the invention to both edges of the tread reinforcement, the reinforcement not necessarily being symmetrical or having a symmetrical effect with respect to the equatorial plane of the tire, this arrangement applies just as well to a single edge of the tread reinforcement. In the event that, in accordance with the invention, the tread reinforcement comprises only one emerging portion, it is advisable to mount the tires in accordance with the invention with the emerging portion directed towards the inside of the vehicle on which the tires are used. This arrangement is favorable whatever the nature of the ground (highways, building sites, quarries, etc.) on which the vehicle travels. As a matter of fact it has been found that it is the edge of the tread reinforcement which is directed towards the inside of the vehicle which is most frequently subject to the defect of separation between tread plies or exposed to damage coming from external agents such as stones, rocks, etc. For tires intended to travel, at least in part, off highways, it is advantageous to use jointly the arrangement in accordance with the invention on the side of the tire which is towards the inside of the vehicle and the arrangement in accordance with French patent No. 1,452,787 on the side of the tire on the outside of the vehicle. This manner of mounting the tires in accordance with the invention which are provided with a single portion emerging from the tread reinforcement also applies to twin tires on a single hub, although the arrangement with two emerging portions in this case gives better results.

In the case of tires intended for travel off highways, one can also combine on one and the same edge of the tread reinforcement (a) the lateral protrusion of the tread in accordance with French patent No. 1,452,787 and (b) an emerging portion of the tread reinforcement in accordance with the present invention. It is then advantageous to replace the rubber portion of the lateral protrusion located radially inward of the emerging portion of the tread reinforcement by means of radial supporting ribs in order to isolate the emerging portion of the tread reinforcement from the reactions of the sidewalls of the tire. Another solution involves forming the radially inner portion of a very elastic rubber, as indicated above.

BRIEF DESCRIPTION OF THE DRAWING

A better understanding of the invention may be gained from a consideration of the following detailed description of the preferred embodiments thereof, in conjunction with the accompanying figures of the drawing, wherein.

DESCRIPTION OF THE PREFERRED EMBODIMENTS

Figure 1:
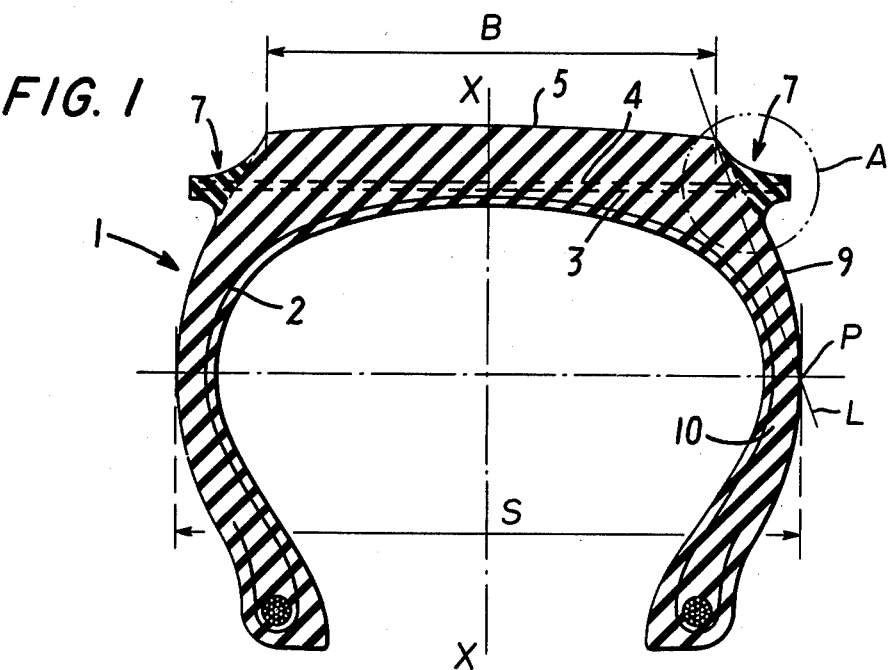
FIG. 1 is a radial cross section through a tire in accordance with the invention.
Figure 1A:
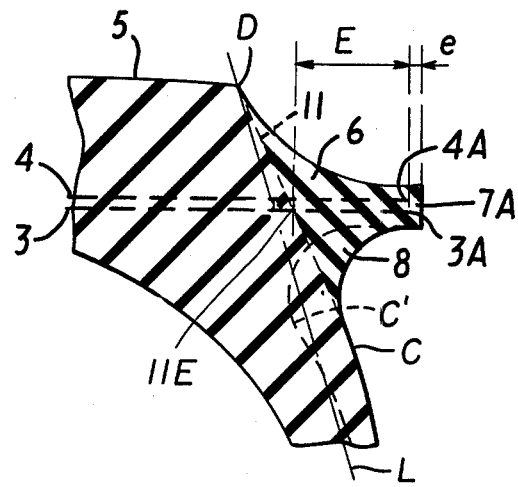
FIG. 1A is a view on a larger scale of the portion of FIG. 1 surrounded by the circle A.
Figure 4:
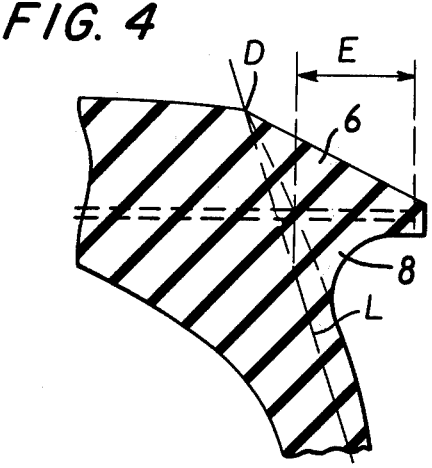
FIGS. 4, 5 and 6 are views similar to FIG. 1A showing three different embodiments.
Figure 5:
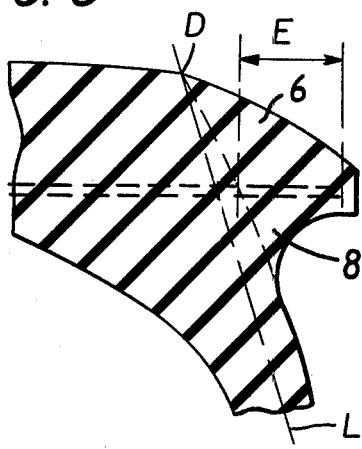
Figure 6:
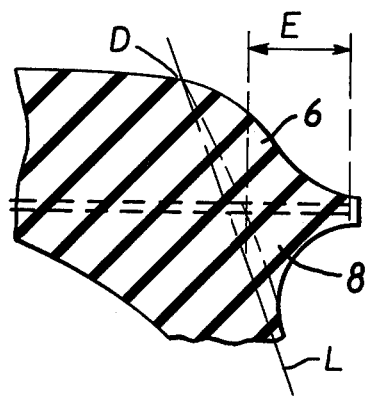

In the radial section of FIG. 1, the tire 1 has a carcass reinforcement 2 and a tread reinforcement formed of two plies 3 and 4 of cords or cables the ends of which 3A and 4A (see FIG. 1A) emerge in accordance with the invention from the apparent contour 11 of the tread 5. FIG. 1 also shows the maximum axial width S reached by the outer surface of the sidewalls; the axial width B of the tread at the level of its surface which is intended to come into contact with the ground (see also FIG. 7); the width E (FIG. 1A) of the emerging portion of the tread reinforcement, this width being measured from the point 11E at which the reinforcement intersects the line 11; the axial thickness e of the portion 7A axially outside the rubber which covers said emerging portion 7; and finally the median or equatorial plane X—X of the tire. As can be seen, the edges of the tread reinforcement 3, 4 are covered with rubber 6. The rubber 6, which is located radially outward of the emerging portion 7 of the tread reinforcement, has a profile such that it does not come into contct with the ground (see FIG. 7). This profile may, for instance, be concave (FIGS. 1, 1A, 2, 3 and 7), linear (FIG. 4), convex (FIG. 5), sinusoidal (FIG. 6), etc.

The rubber 8 which is located radially on the interior of the emerging portion 7 has a profile which is concave and connects with the contour 9 of the sidewall 10 along a path which passes either entirely to the outside of the line L or entirely to the inside of the line L or else intersects the line L at at least one point. See, for instance, the contour lines C and C' in FIG. 1A. The line L is an imaginary line which connects the edge of the ground-contacting portion of the tread 5 to the point P at which the tire, mounted on its rim and inflated but not under load, has its maximum width. The edge of the ground-contacting portion of the tread 5 may be defined as being formed by the circumferential line D (FIGS. 1A and 2-7), which is where the ground-contacting face of the tire and the emerging portion 7 meet. When, as in the case of FIG. 6, the edge of the ground-contacting portion of the tread 5 is not clearly marked, the point D is to be determined by placing the inflated tire on a horizontal flat surface and applying the rated load. The point D is then at a distance from the equatorial plane X—X of the tire equal to one half of the maximum width of the area of contact of the tread with the ground.

Figure 2:
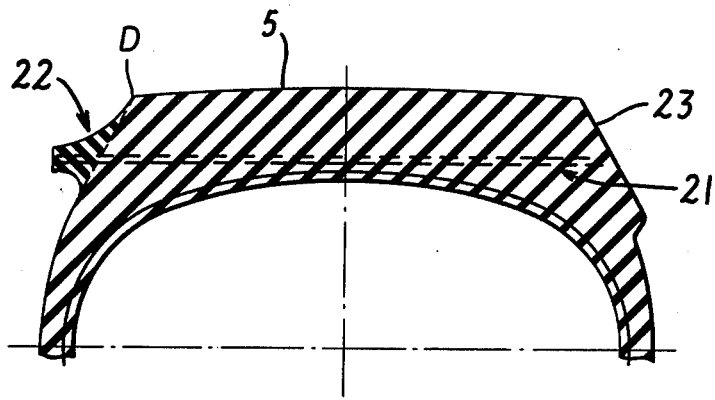
FIG. 2 is a radial section through the radially outer zone of another tire in accordance with the invention.
Figure 7:
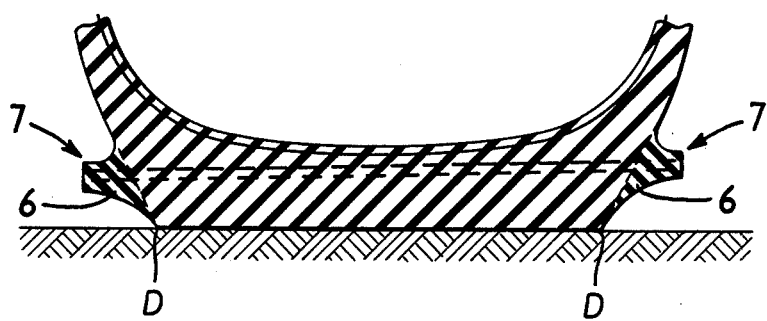
FIG. 7 shows, also in radial section, the radially outer zone of the tire of FIG. 1, in this case in contact with the ground.

While the tread reinforcement shown in FIGS. 1 and 7 has two emerging portions 7, the reinforcement 21 shown in the cross section of FIG. 2 has only a single one, designated 22. On the side where it does not emerge from the tread 5, the tread reinforcement 21 has an ordinary structure; on the other hand, the tread has a lateral extension 23 in accordance with French patent No. 1,452,787. The embodiment of the invention shown in FIG. 2 is suitable for tires intended to travel off highways, for instance at construction sites.

Figure 3:
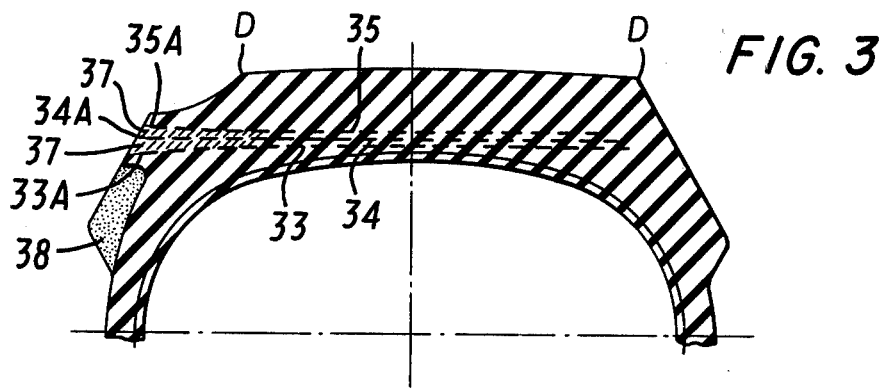
FIG. 3 is a view similar to FIG. 2 of a third tire in accordance with the invention.

FIG. 3 shows a variant of the embodiment illustrated in FIG. 2. This variant differs from that of FIG. 2 by the presence, on the side where the tread reinforcement emerges, between the ends 33A and 34A on the one hand and 34A and 35A on the other hand, of the plies 33, 34, 35 forming this reinforcement, of a narrow strip of rubber 37. The modulus of this rubber is at least equal to that of the rubber forming the tread. On this same side, the pneumatic tire has a lateral reinforcement with radial grooves defining radial ribs 38 in the rubber located radially inward of the emerging portion of the plies 33, 34, and 35. The plane of the drawing passes through one of these radial grooves.

Thus there is provided in accordance with the invention a novel and highly-effective pneumatic tire. Many modifications of the representative embodiments thereof described above will readily occur to those skilled in the art upon consideration of this disclosure. Accordingly, the invention is to be construed as including all structure which is within the scope of the appended claims and equivalents thereof.

I claim:

1. A pneumatic tire having a tread reinforcement having a meridian curvature which is less than its circumferential curvature and formed of at least two superimposed plies of cords which are parallel in each ply and crisscross from one ply to the other, a tread of which the surface intended to make contact with the ground is narrower than the tread reinforcement, and a pair of sidewalls extending inwardly respectively from each edge of the tread, characterized in that:

the superimposed plies of the tread reinforcement have cords arranged at angles of an absolute value at most equal to 45° with respect to the longitudinal direction of the tire, at least in the zones farthest from the equatorial plane of the tire;

on at least one side of the equatorial plane, said at least two superimposed plies of said tread reinforcement emerge laterally from the portion of the tread not in contact with the ground, by an axial length at most equal to 50 percent of the axial half-width of the tread, measured at the place where the tread reinforcement emerges from the apparent contour of the tread; and rubber surrounds the emerging portion of the tread reinforcement on all sides, the surface of the rubber covering the radially outer face of said emerging portion, as seen in radial section, being located at a distance from the axis of rotation of the tire less than the distance from the axis of rotation to the surface of the tread intended to make contact with the ground, and the radial profile of the surface of the rubber covering the radially inner face of the emerging portion of the tread reinforcement being concave, the concavity facing the outside of the pneumatic tire, the emerging portion of the tread reinforcement being thus isolated from the reactions of the adjacent sidewall.

2. A pneumatic tire according to claim 1, wherein the emerging portion of the tread reinforcement is less than 20 percent of the axial half-width of the tread at the point of emergence.

3. A pneumatic tire according to claim 1, wherein the emerging portion of the tread reinforcement is between 4% and 10% of the axial half-width of the tread at the point of emergence.

4. A pneumatic tire according to claim 1, wherein the sum of the half-width of the tread reinforcement and of the emerging portion thereof is between 45% and 60% of the greatest outer axial width of the pneumatic tire, measured at the level of the sidewalls.

5. A pneumatic tire according to claim 1, wherein the portion of the rubber covering the emerging portion of the tread reinforcement which is axially external to said emerging portion has a thickness, measured in the axial direction, of between 1% and 10% of the axial half-width of the tread at the place where the tread reinforcement emerges from the tread.

6. A pneumatic tire according to claim 1, wherein the rubber covering the radially inner face of the emerging portion of the tread reinforcement has a modulus of between 80 and 200 g/mm$^2$ at 100% elongation.

7. A pneumatic tire according to claim 1, further comprising strips of rubber of reduced width interposed between the ends of the tread reinforcement plies.

8. A pneumatic tire according to claim 1, wherein the tread reinforcement has only one emerging portion, intended to be placed on the inner side of the vehicle.

9. A pneumatic tire according to claim 1, wherein the radial profile of the surface of the rubber covering the radially outer face of the emerging portion of the tread reinforcement is concave.

10. A pneumatic tire according to claim 1, wherein the radial profile of the surface of the rubber covering the radially outer face of the emerging portion of the tread reinforcement is linear.

11. A pneumatic tire according to claim 1, wherein the radial profile of the surface of the rubber covering the radially outer face of the emerging portion of the tread reinforcement is convex.

12. A pneumatic tire according to claim 1, wherein the radial profile of the surface of the rubber covering the radially outer face of the emerging portion of the tread reinforcement is sinusoidal.

13. A pneumatic tire having a tread reinforcement formed of at least two superimposed plies of cords which are parallel in each ply and crisscross from one ply to the other, and a tread of which the surface intended to make contact with the ground is narrower than the tread reinforcement, characterized in that:
- the superimposed plies of the tread reinforcement have cords arranged at angles of an absolute value at most equal to 45° with respect to the longitudinal direction of the tire, at least in the zones farthest from the equatorial plane of the tire;
- on at least one side of the equatorial plane, said at least two superimposed plies of said tread reinforcement emerge laterally from the portion of the tread not in contact with the ground, by an axial length at most equal to 50 percent of the axial half-width of the tread, measured at the place where the tread reinforcement emerges from the tread; and
- rubber surrounds the emerging portion of the tread reinforcement on all sides, the surface of the rubber covering the radially outer face of said emerging portion, as seen in radial section, being located at a distance from the axis of rotation of the tire less than the distance from the axis of rotation to the surface of the tread intended to make contact with the ground, and the rubber covering the radially inner face of the emerging portion of the tread reinforcement having ribs which are separated by radial grooves.

* * * * *